Oct. 7, 1924.  
E. D. PRIEST  
ELECTRIC LOCOMOTIVE  
Filed Aug. 4, 1920  
1,511,064  
2 Sheets-Sheet 2

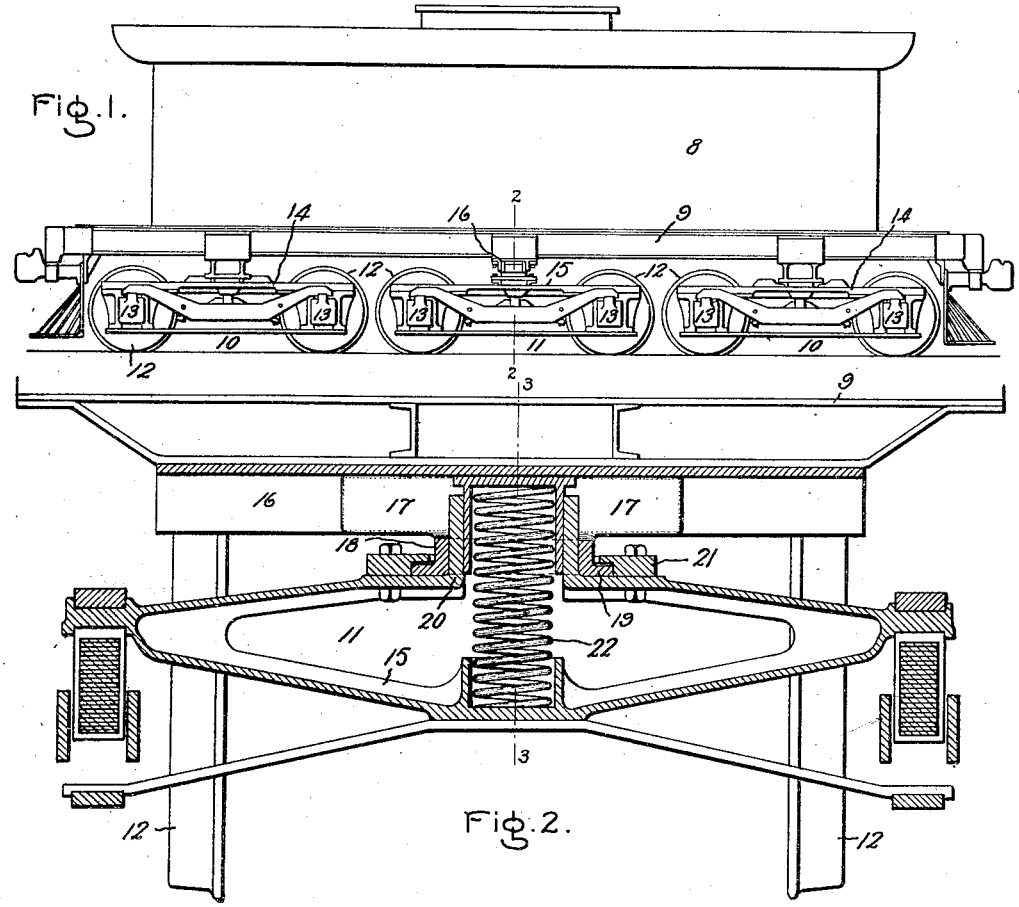
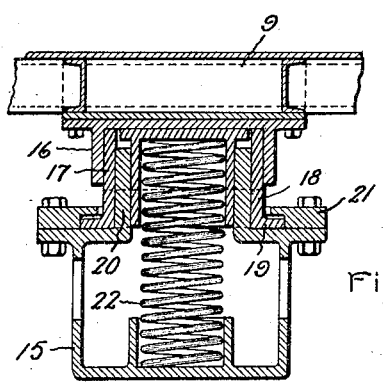

Inventor:
Edward D. Priest,
by
His Attorney.

Patented Oct. 7, 1924.

1,511,064

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

ELECTRIC LOCOMOTIVE.

Application filed August 4, 1920. Serial No. 401,206.

*To all whom it may concern:*

Be it known that I, EDWARD D. PRIEST, a citizen of the United States, residing at Schenectady, in the county of Schenectady, State of New York, have invented certain new and useful Improvements in Electric Locomotives, of which the following is a specification.

My invention relates to electric locomotives and cars, and particularly to such locomotives and cars having more than four axles.

Heretofore, in designing an electric locomotive for more than four axles, it has been the practice to change the design of the locomotive quite radically.

My invention consists in providing the added axles in an intermediate truck or trucks pivotally mounted and free to move transversely with respect to the locomotive or car frame. Such an additional truck or trucks will become a tractor and add to the tractive effort of the complete locomotive. Such a construction does not require any radical change in the design of the locomotive and will therefore be inexpensive to manufacture.

Figure 4:
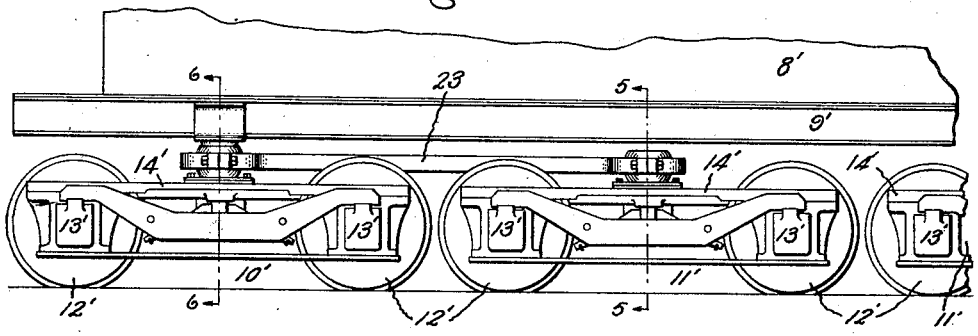
Figure 5:
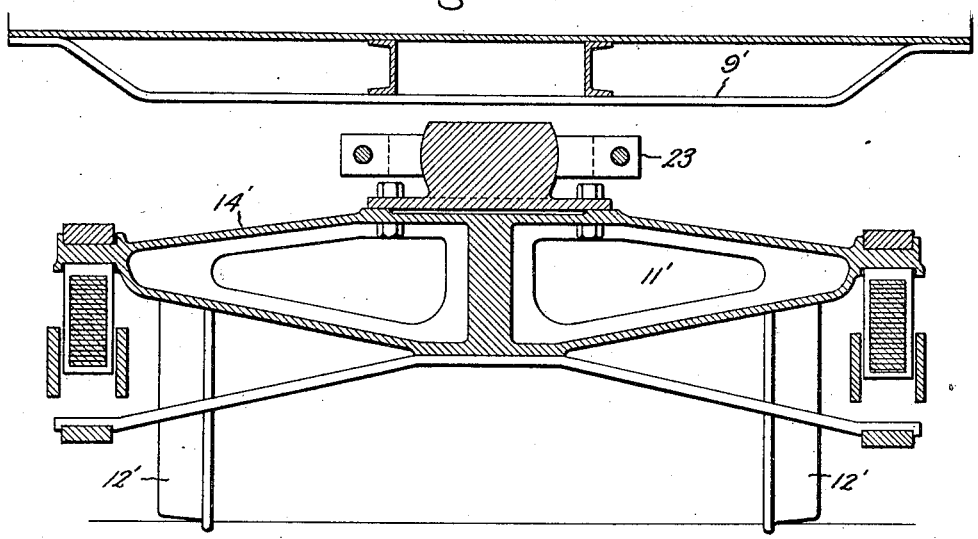
Figure 6:
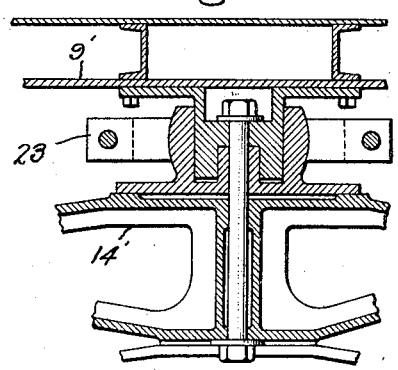
Figure 7:
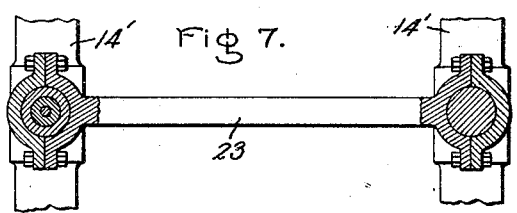

Other features of novelty which characterize my invention are pointed out in the claims annexed to and forming a part of this specification. For a better understanding of my invention, reference may be had to the following description taken in connection with the accompanying drawings, in which Fig. 1 is a skeleton view of a locomotive in which my invention is embodied; Fig. 2 is a sectional view taken on the line 2—2 of Fig. 1; Fig. 3 is a sectional view taken on the line 3—3 of Fig. 2; Fig. 4 is a skeleton view of a locomotive in which is embodied a modification of my invention; Fig. 5 is a sectional view taken on the line 5—5 of Fig. 4; Fig. 6 is a sectional view taken on the line 6—6 of Fig. 4; and Fig. 7 is a view partly in section of a detail.

In the drawings, I have shown locomotives each comprising at least three trucks, each truck being operative by itself and guided independently of the other trucks, a car frame supported on at least two of the trucks, at least one of the other trucks being located intermediate said first mentioned trucks and pivotally mounted and free to move transversely with respect to the car frame.

Referring to Figs. 1 and 3 of the drawings, 8 is a cab structure mounted on a car frame 9. This car frame is supported on two trucks 10, one at each end. The trucks 10 are preferably swivel trucks. A third truck 11 is provided intermediate the trucks 10. This third truck is pivotally mounted and free to move transversely with respect to the car frame 9. Each of the trucks 10 comprises two axles on which the wheels 12 are mounted, journal boxes 13 for the axles and truck frames 14 supported on the journal boxes. The truck 11 is similar to the trucks 10 except that its truck frame 15 is of a slightly different construction as will be pointed out hereafter. Each of the axles of all of the trucks are shown as driving axles, that is, they are driven by electric motors (not shown) in the usual manner. The three trucks in Fig. 1 are of similar construction and are shown as of equal weight, and since each of the trucks has two axles, each is operative by itself and is also guided independently of the other trucks.

The connection of the truck 11 to the car frame so that it can move transversely with respect thereto is obtained by means of a channel shaped member 16 fastened across the bottom of the car frame 9, in which members 17 can move transversely with respect to the car frame. The swivel connection of the truck 11 to the car frame is obtained by providing the members 17 with an integral circular member 18 formed with a circular flange 19. This circular member 18 surrounds a circular extension 20 on the truck frame. The circular flange 19 is engaged by a member 21 bolted to the truck frame. The car frame is supported on the truck frame of truck 11 through a spring 22 which is suitably guided in the truck frame as shown in Figs. 2 and 3.

In the modification of my invention shown in Figs. 4 to 7, I have shown slightly more than one half of a locomotive provided with four trucks, the two end trucks 10' on which the car frame is mounted are swivel trucks, and the two intermediate trucks 11' are free to move transversely with respect to the car frame and to swivel. Instead, however, of the car frame being directly mounted on these trucks, these trucks 11' are pivotally connected to bars 23, each of which in turn is pivotally connected to one of the trucks 10', as clearly shown in the drawings.

Each of the trucks 10' and 11' of Figs. 4 to 7 comprises two axles on which wheels 12' are mounted, journal boxes 13' for the axles and truck frames 14' supported on the journal boxes. Each of the axles may be driving axles.

In the construction of Figs. 4 to 7, the intermediate trucks 11' will preferably be of a weight equal to the weight of one of the trucks 10' plus one-quarter of the structure resting on the trucks 10'.

I aim in the appended claims to cover all modifications which do not depart from the spirit and scope of my invention.

What I claim as new and desire to secure by Letters Patent of the United States, is:—

1. In a locomotive or car, a car frame, at least three trucks, each of said trucks being operative by itself and guided independently of said other trucks, each of said trucks comprising a plurality of axles, journal boxes for said axles and a truck frame supported on said journal boxes, means for supporting said car frame on at least two of said truck frames, at least one of said trucks being located intermediate said other trucks and pivotally mounted and free to move transversely with respect to said car frame.

2. In a locomotive or car, a car frame, at least three trucks, each of said trucks being operative by itself and guided independently of said other trucks, each of said trucks comprising a plurality of axles, one of said axles on each truck being a driving axle, journal boxes for said axles and a truck frame supported on said journal boxes, means for pivotally supporting said car frame on at least two of said truck frames, at least one of said trucks being located intermediate said other trucks and pivotally mounted and free to move transversely with respect to said car frame.

3. In a locomotive or car, a car frame, at least three trucks, each of said trucks being operative by itself and guided independently of said other trucks, each of said trucks comprising a plurality of axles, one of said axles on each truck being a driving axle, journal boxes for said axles and a truck frame supported on said journal boxes, means for supporting said car frame on at least two of said truck frames, at least one of said trucks being located intermediate said other trucks and pivotally mounted and free to move transversely with respect to said car frame and being of a weight at least equal to the weight of one of said other trucks.

4. In a locomotive or car, a car frame, three trucks, each of said trucks being operative by itself and guided independently of said other trucks, each of said trucks comprising a plurality of axles, journal boxes for said axles and a truck frame supported on said journal boxes, means for supporting said car frame on at least two of said truck frames, said other truck being located intermediate said other two trucks, said intermediate truck being pivotally mounted and free to move transversely with respect to said car frame.

5. In a locomotive or car, a car frame, three trucks, each of said trucks being operative by itself and guided independently of said other trucks, each of said trucks comprising a plurality of axles, one of said axles on each truck being a driving axle, journal boxes for said axles and a truck frame supported on said journal boxes, means for pivotally supporting said car frame on at least two of said truck frames, said other truck being located intermediate said other two trucks, said intermediate truck being pivotally mounted and free to move transversely with respect to said car frame.

6. In a locomotive or car, a car frame, three trucks, each of said trucks being operative by itself and guided independently of said other trucks, each of said trucks comprising a plurality of axles, one of said axles on each truck being a driving axle, journal boxes for said axles and a truck frame supported on said journal boxes, means for pivotally supporting said car frame on at least two of said truck frames, said other truck being located intermediate said other two trucks, said intermediate truck being pivotally mounted and free to move transversely with respect to said car frame, said intermediate truck being of a weight at least equal to the weight of one of said other two trucks.

In witness whereof, I have hereunto set my hand this 3rd day of August, 1920.

EDWARD D. PRIEST.